United States Patent
Hara et al.

(10) Patent No.: US 8,730,407 B2
(45) Date of Patent: May 20, 2014

(54) REMOTE CONTROL COMMAND SETTING DEVICE AND METHOD FOR SETTING REMOTE CONTROL COMMAND

(75) Inventors: Noriyo Hara, Tokyo (JP); Meiko Maeda, Kanagawa (JP); Masaki Yamauchi, Osaka (JP); Shigenori Maeda, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/125,243

(22) PCT Filed: Jun. 15, 2012

(86) PCT No.: PCT/JP2012/003927
§ 371 (c)(1),
(2), (4) Date: Dec. 10, 2013

(87) PCT Pub. No.: WO2013/001738
PCT Pub. Date: Jan. 3, 2013

(65) Prior Publication Data
US 2014/0098301 A1    Apr. 10, 2014

(30) Foreign Application Priority Data

Jun. 30, 2011 (JP) ................................. 2011-145617

(51) Int. Cl.
*H04N 5/44* (2011.01)

(52) U.S. Cl.
USPC ........................................................ 348/734

(58) Field of Classification Search
CPC ......... H04N 5/44; H04N 7/173; H04N 5/232; H04N 5/445; H04N 7/18; H04N 7/20; H04L 7/00; H04M 11/00; G08C 17/02; G08C 17/00; G08C 2201/10; G08C 2201/12; G08C 2201/40; G08C 15/12

USPC ............... 348/734, 725, 552, 553; 340/12.22, 340/12.23, 12.54
See application file for complete search history.

(56) References Cited

U.S. PATENT DOCUMENTS 5,081,608 A * 1/1992 Tamura et al. ................. 707/758
5,452,469 A * 9/1995 Sone et al. ..................... 712/245

(Continued)

FOREIGN PATENT DOCUMENTS

CN    101751125 A    6/2010
JP    7-222270 A    8/1995

(Continued)

OTHER PUBLICATIONS

International Search Report for PCT/JP2012/003927 dated Aug. 21, 2012.

*Primary Examiner* — Paulos M Natnael
(74) *Attorney, Agent, or Firm* — Pearne & Gordon LLP

(57) ABSTRACT

Provided is a remote control command setting device capable of regulating some operations while being easy to handle for children. The device reconfigures a correspondence between an operation for an operation area having multiple operation buttons arranged therein and a control command for an electric device. The device includes an operation history holding unit (180) for accumulating operation history for the operation area, a control command setting unit (200) for reconfiguring an available control command on the basis of the operation history, and an operation area setting unit (210) for reconfiguring a sub-area in the operation area on the basis of the operation history and the available control command.

12 Claims, 17 Drawing Sheets

(56) References Cited

U.S. PATENT DOCUMENTS

| | | | |
|---|---|---|---|
| 6,529,138 B2 * | 3/2003 | Satoh | 340/12.22 |
| 6,910,086 B1 * | 6/2005 | Inoue et al. | 710/110 |
| 7,453,371 B2 * | 11/2008 | Niyama et al. | 340/12.54 |
| 7,467,322 B2 * | 12/2008 | Baba | 714/4.11 |
| 8,582,036 B2 * | 11/2013 | Ueno et al. | 348/734 |
| 8,621,530 B1 * | 12/2013 | Guzman et al. | 725/82 |
| 2006/0048181 A1 * | 3/2006 | Kim et al. | 725/37 |
| 2007/0146160 A1 | 6/2007 | Takeshita | |
| 2010/0134411 A1 | 6/2010 | Tsumura et al. | |

FOREIGN PATENT DOCUMENTS

| | | |
|---|---|---|
| JP | 2006-013946 A | 1/2006 |
| JP | 2007-038041 A | 2/2007 |
| JP | 2007-181068 A | 7/2007 |
| JP | 2010-102465 A | 5/2010 |
| JP | 2010-134629 A | 6/2010 |
| WO | 02/21877 A1 | 3/2002 |

* cited by examiner

FIG. 7A

FIRST CHILDREN'S CONTENT TABLE

| ORDER | CHILDREN'S CONTENT |
|---|---|
| 1 | LAUGH IN JAPANESE LANGUAGE |
| 2 | EXCITING |
| 3 | WITH DAD |

FIG. 7B

SECOND CHILDREN'S CONTENT TABLE

| ORDER | CHILDREN'S CONTENT |
|---|---|
| 1 | HELLO INSECTS |
| 2 | MENDEL COMES |

FIG. 7C

THIRD CHILDREN'S CONTENT TABLE

| ORDER | CHILDREN'S CONTENT |
|---|---|
| 1 | TWO-PIECE |
| 2 | KITARO OF KEKEKE |

FIG. 15

| No | CONTENT ID | TITLE | GENRE | RECORDING DATE | START TIME | DURATION |
|---|---|---|---|---|---|---|
| 1 | 01C001 | EXCITING (1) | EDUCATION | JANUARY 17 | 16:45 | 0:15 |
| 2 | 04C002 | SMILE | EDUCATION | JANUARY 19 | 17:00 | 0:15 |
| 3 | 01B001 | QUARTET | MUSIC | JANUARY 20 | 17:00 | 0:15 |
| 4 | 01C003 | EXCITING (2) | EDUCATION | JANUARY 20 | 16:45 | 0:15 |
| 5 | 06D001 | ANTANPAN | ANIMATION | JANUARY 23 | 8:00 | 0:15 |
| 6 | 01A001 | MENDEL COMES | ANIMAL | JANUARY 23 | 19:30 | 0:30 |
| 7 | 01B002 | WITH DAD | MUSIC | JANUARY 24 | 16:20 | 0:25 |
| 8 | 01C004 | EXCITING (3) | EDUCATION | JANUARY 24 | 16:45 | 0:15 |
| 9 | 06D002 | KITARO OF KEKEKE | ANIMATION | JANUARY 24 | 9:00 | 0:30 |
| 10 | 08D003 | TWO-PIECE | ANIMATION | JANUARY 24 | 9:30 | 0:30 |
| 11 | 01B003 | LAUGH IN JAPANESE LANGUAGE | MUSIC | JANUARY 24 | 17:05 | 0:15 |
| 12 | 01A002 | HELLO INSECTS | ANIMAL | JANUARY 25 | 8:00 | 0:15 |

CONTENT TABLE 660 / 661 / 662 / 663

| No | CONTENT ID | TITLE |
|---|---|---|
| 1 | 01A002 | HELLO INSECTS |
| 2 | 01B003 | LAUGH IN JAPANESE LANGUAGE |
| 3 | 08D003 | TWO-PIECE |
| 4 | 06D002 | KITARO OF KEKEKE |
| 5 | 01C004 | EXCITING (3) |
| 6 | 01B002 | WITH DAD |
| 7 | 01A001 | MENDEL COMES |
| 8 | 06D001 | ANTANPAN |
| 9 | 01C003 | EXCITING (2) |
| 10 | 01B001 | QUARTET |
| 11 | 04C002 | SMILE |
| 12 | 01C001 | EXCITING (1) |

FIG. 16

CONTENT TABLE

| No | CONTENT ID | TITLE |
|---|---|---|
| 1 | 01B003 | LAUGH IN JAPANESE LANGUAGE |
| 2 | 08D003 | TWO-PIECE |
| 3 | 06D002 | KITARO OF KEKEKE |
| 4 | 01B002 | WITH DAD |
| 5 | 06D001 | ANTANPAN |
| 6 | 01B001 | QUARTET |

FIG. 17A

CONTENT TABLE

| No | CONTENT ID | TITLE |
|---|---|---|
| 1 | 01A002 | HELLO INSECTS |
| 2 | 01C004 | EXCITING (3) |
| 3 | 01A001 | MENDEL COMES |
| 4 | 01C003 | EXCITING (2) |
| 5 | 04C002 | SMILE |
| 6 | 01C001 | EXCITING (1) |

FIG. 17B

REMOTE CONTROL COMMAND SETTING DEVICE AND METHOD FOR SETTING REMOTE CONTROL COMMAND

TECHNICAL FIELD

The present invention relates to a remote control command setting apparatus and a remote control command setting method capable of resetting a correspondence between an operation in an operation region where a plurality of operation buttons are disposed and a control command for electrical equipment.

BACKGROUND ART

A remote controller (hereinafter, referred to as "remote control" as appropriate) is often used to operate AV equipment such as a television set or a recorder. In a residence, there are many cases where a child performs a remote control operation or an infant plays at imitating a remote control operation.

Meanwhile, if an infant or child (hereinafter, collectively referred to as a "child") is allowed to freely handle a remote control, there is concern that a control command that an adult does not want the infant or child to enter, such as deletion of a file, is input to AV equipment.

In this respect, for example, PTL 1 to PTL 3 disclose a technique for resetting a correspondence between an operation in an operation region where a plurality of operation buttons are disposed and a control command for electrical equipment.

In techniques disclosed in PTL 1 and PTL 2, some of a plurality of control commands associated with the respective operation buttons in a one-to-one relationship are disabled. In a technique disclosed in PTL 3, in a remote control having a liquid crystal touch panel as an operation region, operation buttons displayed on the liquid crystal touch panel are changed depending on the age of the user.

According to the related art, it is possible to prevent a control command that an adult does not want a child to enter from being input to AV equipment by an operation of a child.

CITATION LIST

Patent Literature

PTL 1
Japanese Patent Application Laid-Open No. 2007-38041
PTL 2
Japanese Patent Application Laid-Open No. 2006-13946
PTL 3
International Publication No. WO 2002/021877

SUMMARY OF INVENTION

Technical Problem

However, there is a problem in that it is difficult for a child to use a remote control to which the above-described related art is applied.

The reason for the difficulty is as follows. A child's hand is small in the first place, so that there are not many operation buttons where the fingers of a child can reach or operation buttons easily pushed by fingers of a child. In addition, a region of easily operable operation buttons is different for each child and even changes with the growth of the child. However, in the techniques disclosed in PTL 1 and PTL 2, it is difficult to reflect characteristics of an individual hand in an operation button to be disabled or in a displayed operation button.

An object of the present invention is to provide a remote control command setting apparatus and a remote control command setting method capable of realizing a remote control which is easily used by a child, while limiting some operation of the remote control.

A remote control command setting apparatus according to an aspect of the present invention is an apparatus configured to reset a correspondence between an operation in an operation region where a plurality of operation buttons are disposed and a control command for electrical equipment, the remote control command setting apparatus including: an operation history holding section that accumulates an operation history in the operation region; a control command setting section that resets, based on the operation history, the control command which is available, by being triggered by an acquired limitation mode; an operation region setting section that obtains a number of divisions of the operation region based on the operation history and the available control command and updates a correspondence between an operation of the operation button in a division of the operation region and a control command for the electrical equipment, the division having been reset; an operation analysis section that extracts a control command based on the correspondence, for an acquired new operation of the operation button; and an equipment control section that sequentially issues, each time newly receiving the control command, an instruction to reproduce a content corresponding to the control command from a content table which is created in advance in association with the division and in which a reproducible content is described.

A remote control command setting method according to an aspect of the present invention is a method of resetting a correspondence between an operation in an operation region where a plurality of operation buttons are disposed and a control command for electrical equipment, the remote control command setting method including: determining whether or not a timing for resetting the control command which is available has come based on operation history in the operation region; resetting the available control command when the timing has come; resetting a division of the operation region based on the operation history and the available control command when the available control command is reset; obtaining a number of divisions of the operation region based on the operation history and the available control command and updating a correspondence between an operation of the operation button in a division of the operation region and a control command for the electrical equipment, the division having been reset; extracting a control command based on the correspondence for an acquired new operation of the operation button; and sequentially issuing, each time newly receiving the control command, an instruction to reproduce a content corresponding to the control command from a content table which is created in advance in association with the division and in which a reproducible content is described.

Advantageous Effects of Invention

According to the present invention, it is possible to provide a remote control which is easily used by a child, while limiting some operation of the remote control.

BRIEF DESCRIPTION OF DRAWINGS

FIGS. 7A to 7C are diagrams illustrating an example of details of a children's content table according to Embodiment 2 of the present invention;

FIG. 15 is a diagram illustrating an example of details of a content list according to Embodiment 5 of the present invention;

FIG. 16 is a diagram illustrating an example of details of a content table according to Embodiment 5 of the present invention;

FIG. 17A is a diagram illustrating an example of details of a content table according to Embodiment 5 of the present invention, and FIG. 17B is a diagram illustrating an example of details of a content table according to Embodiment 5 of the present invention.

DESCRIPTION OF EMBODIMENTS

Hereinafter, each embodiment of the present invention will be described in detail with reference to the drawings.

Embodiment 1

Embodiment 1 of the present invention is an example of a basic aspect of the present invention.

Figure 1:
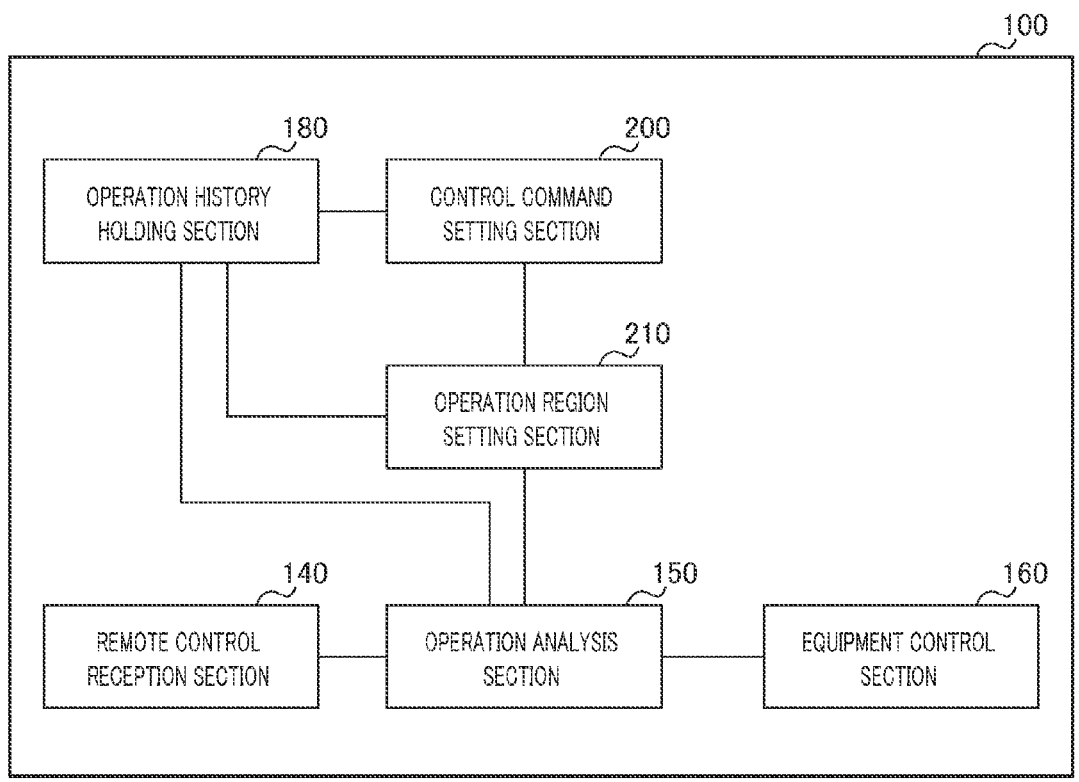
FIG. 1 is a block diagram illustrating an example of a configuration of a remote control command setting apparatus according to Embodiment 1 of the present invention.

FIG. 1 is a block diagram illustrating an example of a configuration of a remote control command setting apparatus according to the present embodiment.

In FIG. 1, remote control command setting apparatus 100 is an apparatus which resets a correspondence between an operation (that is, a remote control signal corresponding to each operation button) in an operation region where a plurality of operation buttons are disposed and a control command for electrical equipment (the term "reset" means "to update or to set again" in this description). In other words, remote control command setting apparatus 100 resets a correspondence (hereinafter, referred to as a "button correspondence") between a remote control signal corresponding to each operation button and a control command for electrical equipment. Specifically, the resetting of the button correspondence is to output the same control command even if any operation button is pushed except for a power button. Remote control command setting apparatus 100 includes remote control reception section 140, operation analysis section 150, equipment control section 160, operation history holding section 180, control command setting section 200, and operation region setting section 210.

Remote control reception section 140 receives a signal (hereinafter, referred to as a "remote control signal") indicating an operation in the operation region from the remote control having the above-described operation region.

Operation analysis section 150 outputs a control command corresponding to an operation indicated by a remote control signal to an equipment control section of electrical equipment, based on a reset button correspondence each time remote control reception section 140 receives the remote control signal.

Equipment control section 160 performs an operation corresponding to an input control command.

Operation history holding section 180 accumulates operation history in the above-described operation region. In other words, operation history holding section 180 acquires an operation indicated by each remote control signal which is received by remote control reception section 140, and maintains the operation.

Control command setting section 200 resets an available control command on the basis of the operation history. In addition, the available control command is a control command which is allowed to be input to equipment control section 160 among control commands received by the equipment control section 160.

Operation region setting section 210 resets a division of the operation region on the basis of the operation history and the available control command. In addition, the division of the operation region refers to grouping the operation buttons on the operation region.

Remote control command setting apparatus 100 has a central processing unit (CPU) and a storage medium such as, for example, a random access memory (RAM). In this case, the above-described respective function sections are implemented by the CPU executing a control program.

This remote control command setting apparatus 100 performs resetting (hereinafter, referred to as "button resetting") of the available control command and the division of the operation region on the basis of the operation history. Accordingly, remote control command setting apparatus 100 can perform button resetting based on an actual operation by a child's hand, and thus it is possible to implement a remote control which is easily used by a child, while limiting some operation of the remote control.

In addition, FIG. 1 assumes a case where the remote control command setting apparatus according to the present invention is disposed on an electrical equipment side, but an application of the present invention is not limited thereto. For example, in a case where the remote control command setting apparatus according to the present invention is disposed on a remote control side, remote control reception section 140 and equipment control section 160 are not necessary.

Embodiment 2

Embodiment 2 of the present invention is an example in which a remote control operation mode changes between a normal mode and a limitation mode, and button resetting is performed on the limitation mode according to operation history in the limitation mode.

First, a configuration of a remote control command setting apparatus according to the present embodiment will be described.

Figure 2:
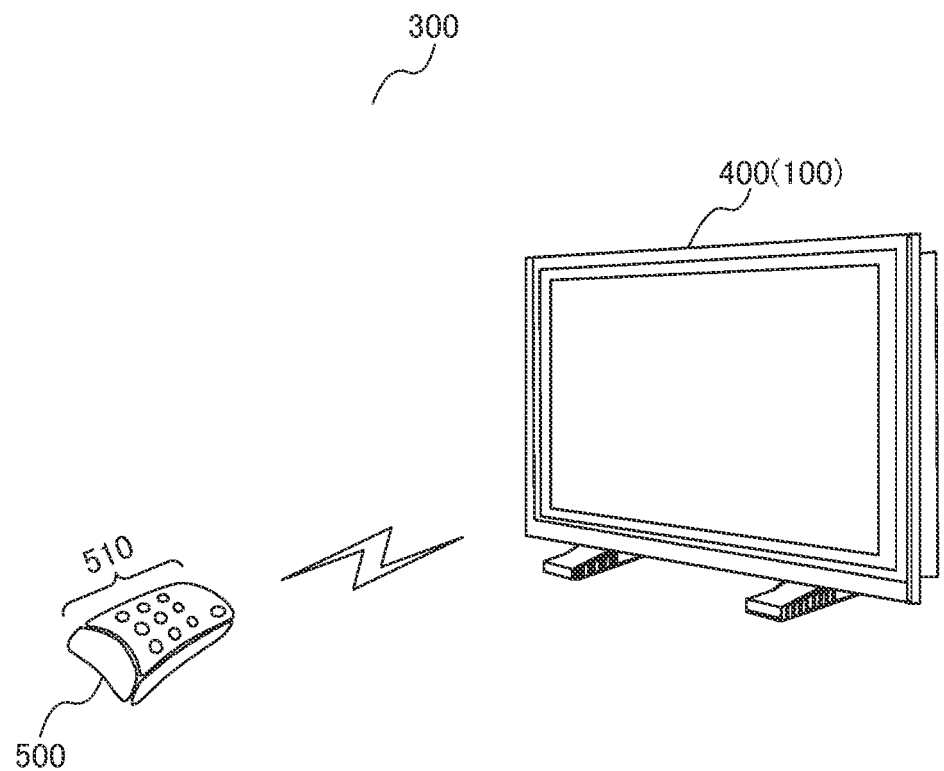
FIG. 2 is a system configuration diagram illustrating a configuration of an AV system in which a remote control command setting apparatus according to Embodiment 2 of the present invention is used.

FIG. 2 is a system configuration diagram illustrating a configuration of an AV system in which the remote control command setting apparatus according to the present embodiment is used.

In FIG. 2, AV system 300 includes television set 400 having remote control command setting apparatus 100, and remote control 500 operating television set 400.

Television set 400 is an electrical apparatus of which an operation is controlled by remote control command setting apparatus 100 described later. A program which is received as a display target by television set 400 is hereinafter referred to as "content".

Remote control 500 is an apparatus operating television set 400, and is annexed to television set 400 or is available on the market. Remote control 500 has virtual operation region 510 where a plurality of operation buttons are disposed.

Figure 3:
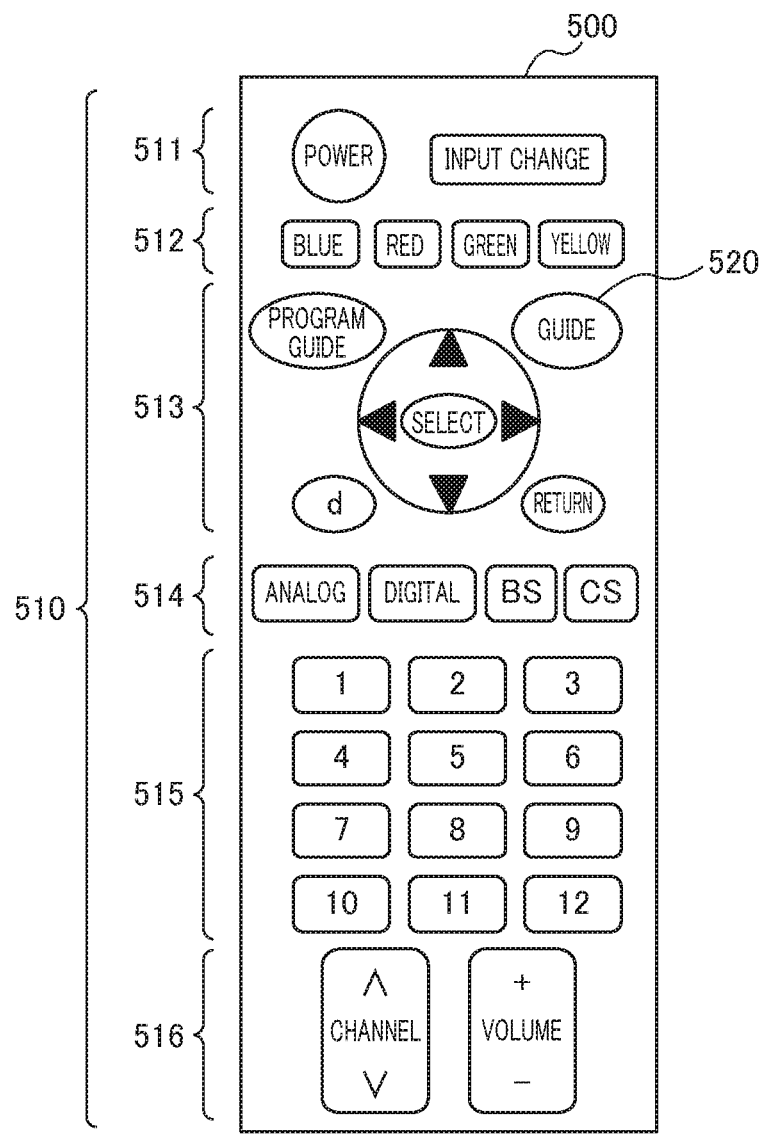
FIG. 3 is a plan view illustrating an example of an exterior of a remote control according to Embodiment 2 of the present invention.

FIG. 3 is a plan view illustrating an example of an exterior of remote control 500.

As illustrated in FIG. 3, remote control 500 virtually has operation region 510 which includes a plurality of operation buttons 520 which are key switches on a surface thereof. More specifically, operation region 510 is formed by a plurality of sub-regions 511 to 516 which are vertically divided. In addition, sub-regions 511 to 516 respectively include a plurality of operation buttons 520 disposed in a matrix.

Remote control 500 transmits a remote control signal indicating an operation, for example, using an infrared signal each time the operation is performed in operation region 510. Specifically, remote control 500 stores an identifier (hereinafter, referred to as a "function code") assigned to each of operation buttons 520 in advance, and transmits a function code of operation button 520, which is included in a remote control signal, each time operation button 520 is pushed. In addition, the remote control signal employs a unified format based on, for example, a Household Electric Appliance Association format.

Figure 4:
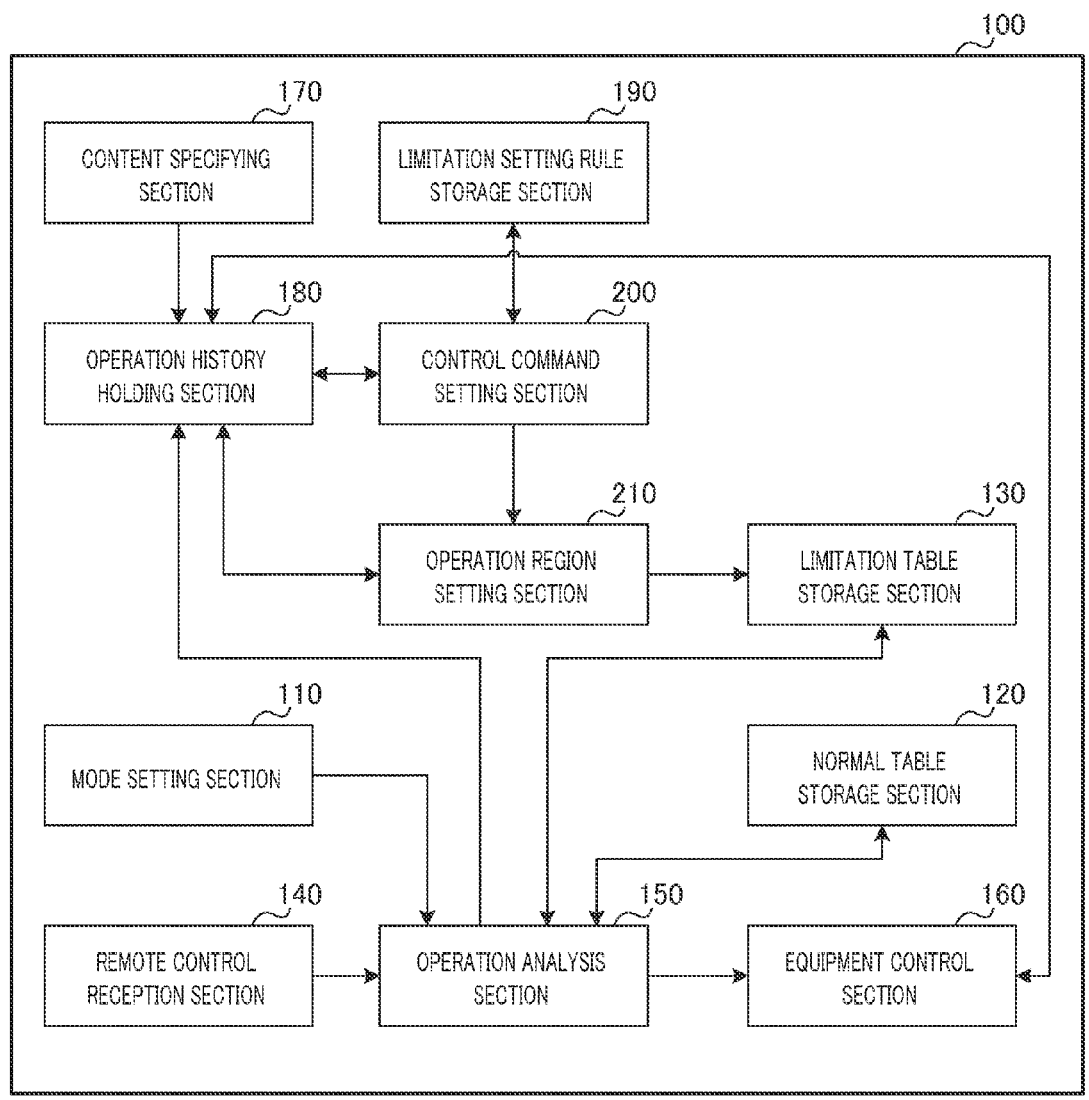
FIG. 4 is a block diagram illustrating an example of a configuration of the remote control command setting apparatus according to Embodiment 2 of the present invention.

FIG. 4 is a block diagram illustrating an example of a configuration of remote control command setting apparatus 100 included in television set 400.

In FIG. 4, remote control command setting apparatus 100 is an apparatus which resets the above-described button correspondence. Remote control command setting apparatus 100 includes mode setting section 110, normal table storage section 120, limitation table storage section 130, remote control reception section 140, operation analysis section 150, equipment control section 160, content specifying section 170, operation history holding section 180, limitation setting rule storage section 190, control command setting section 200, and operation region setting section 210.

Mode setting section 110 switches between a normal mode and a limitation mode and sets one of the mode. The limitation mode is a mode for a user whose use of a control command is to be limited (a child in the present embodiment).

Specifically, a change between the normal mode and the limitation mode is detected based on an operation of a button of a body of television set 400 or a remote control signal, and operation analysis section 150 is notified of the detection result.

In addition, equipment control section 160 is assumed to accept an available control command (hereinafter, appropriately referred to as a "limitation command") which is used only in the limitation mode in addition to an available control command (hereinafter, appropriately referred to as a "normal command") in the normal mode. The limitation command includes a control command different from an available control command (normal command) in the normal mode. For example, a control code of the normal command is expressed by a combination of figures "xxx," and a control code of the limitation command is expressed by a combination of figures "yyy."

In addition, hereinafter, for convenience of description, it is assumed that the power button is treated differently from operation buttons 520, and operation buttons 520 include only four operation buttons 520 having function codes of 60 to 63. In addition, the power button may be treated as one of operation buttons 520, and the number of operation buttons and a function code are not limited to the above-described example.

Normal table storage section 120 stores a normal table which describes a correspondence (a button correspondence) between an available control command in the normal mode and the operation button.

Figure 5:
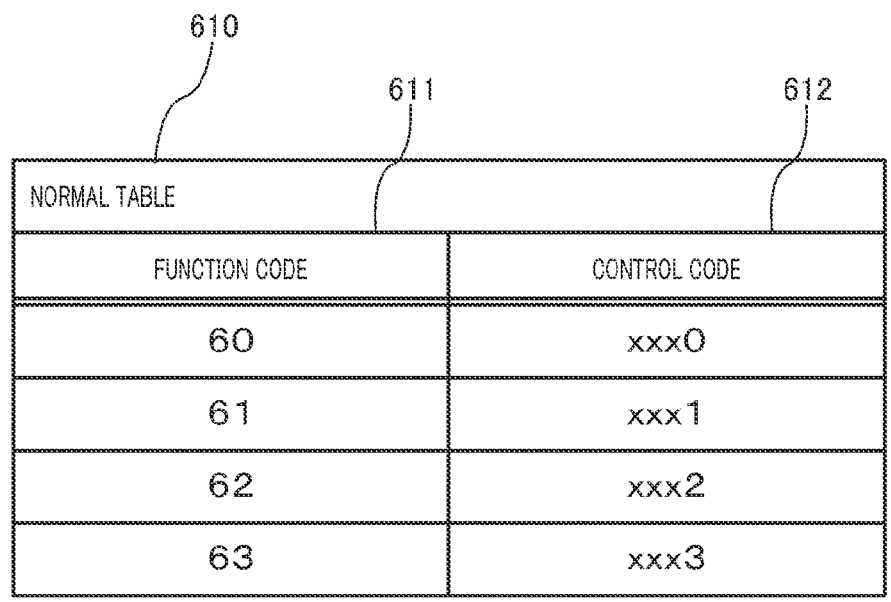
FIG. 5 is a diagram illustrating an example of details of a normal table according to Embodiment 2 of the present invention.

FIG. 5 is a diagram illustrating an example of details of the normal table.

As illustrated in FIG. 5, normal table 610 describes all function codes 611 transmitted by the remote control 500 and identifiers (control codes) 612 of the normal commands in association with each other. In addition, in normal table 610, function codes 611 and control codes 612 are associated with each other in a one-to-one relationship.

Limitation table storage section 130 of FIG. 4 stores a limitation table which describes a correspondence (a button correspondence) between an available control command in the limitation mode and the operation button.

Figure 6:
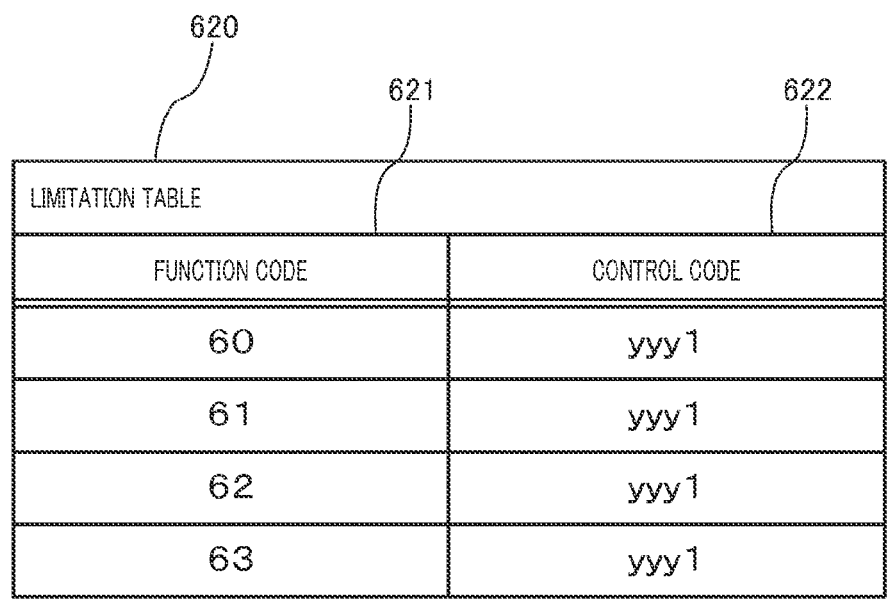
FIG. 6 is a diagram illustrating an example of details of a limitation table according to Embodiment 2 of the present invention.

FIG. 6 is a diagram illustrating an example of details of the limitation table. Here, an initial state of the limitation table is illustrated. The initial state of the limitation table is a state in which resetting has never been performed, and is a state in which the same control command is assigned to all the operation buttons except for some functions such as power supply.

As illustrated in FIG. 6, limitation table 620 describes all function codes 621 transmitted by remote control 500 and identifiers (control codes) 622 of the normal commands and the limitation commands in association with each other.

Here, a control code "yyy1" is assumed as a control code which is recognized as, for example, a content sending operation limited to children's content in equipment control section 160. In other words, the limitation command is assumed to include a new control command (control code) of a reproduction changing operation or the like limited to children's content.

Upon comparison between normal table 610 (refer to FIG. 5) and limitation table 620, it can be seen that there is a difference in control codes 622. In limitation table 620, control code 622 of "yyy1" of not the normal command but the identical limitation command is associated with a plurality of function codes 611 and 621 of "60" to "63." In other words, in limitation table 620, instead of the normal command, the limitation command is associated with operation buttons 520 of the remote control. In addition, accordingly, in limitation table 620, the same limitation command is associated with a plurality of operation buttons 520. Details of limitation table 620 are updated by control command setting section 200 and operation region setting section 210 described later.

Remote control reception section 140 of FIG. 4 receives a remote control signal from remote control 500.

Specifically, each time a remote control signal is transmitted from remote control 500, remote control reception section 140 receives the remote control signal, extracts a function code from the remote control signal, and outputs the function code to operation analysis section 150.

Each time remote control reception section 140 receives a remote control signal, operation analysis section 150 outputs a control command corresponding to an operation (a function code included in the remote control signal) indicated by the remote control signal to equipment control section 160 described later.

Specifically, each time operation button 520 is operated, operation analysis section 150 refers to the normal table 610 (refer to FIG. 5) and outputs a control command corresponding to an operation thereof in the normal mode. In other words, each time a function code is input during the normal mode, operation analysis section 150 extracts a corresponding control command from normal table 610 and outputs the control command to equipment control section 160.

In addition, in the limitation mode, each time operation button 520 is operated, operation analysis section 150 refers to limitation table 620 (refer to FIG. 6), and outputs a control command corresponding to an operation thereof. In other words, each time a function code is input during the control mode, operation analysis section 150 extracts a corresponding control code from limitation table 620, and outputs the control code to equipment control section 160. That is, in the initial state (a state of limitation table 620 illustrated in FIG. 6), an operator (child) can only perform power turning on and off operations and a content sending operation of a program for children in the limitation mode.

Further, in the limitation mode, each time a function code is input, operation analysis section 150 outputs the input function code to operation history holding section 180. In addition, in the limitation mode, each time power turning on and off operations are performed, operation analysis section 150 outputs information indicating the operations to operation history holding section 180.

Equipment control section 160 performs an operation corresponding to an input control command.

Specifically, each time a control code is input, equipment control section 160 performs an operation associated with the control code in advance, such as content changing or volume changing. As described above, equipment control section 160 also receives a control code of the limitation command in addition to a control code of the normal command.

For example, in a case where a control code "yyy1" is input, equipment control section 160 performs changing to display of the first content among children's contents associated with the control code "yyy1." In addition, if the control code "yyy1" is continuously input, equipment control section 160 sequentially changes and displays children's contents of which broadcast is in progress, in a predefined order for each input thereof. In a case where there is no children's content of which broadcast is in progress, equipment control section 160 reproduces, for example, recorded content for children.

In addition, it is assumed that equipment control section 160 stores in advance a plurality of children's content tables which list children's contents for each genre. Further, it is assumed that equipment control section 160 sets a target of a control command in the unit of the children's content table. Specifically, equipment control section 160 appropriately groups genres (that is, lists of children's contents) and sets a correspondence between a control command and a children's content table, on the basis of operation history accumulated by operation history holding section 180 described later.

FIGS. 7A to 7C are diagrams illustrating an example of details of the children's content table.

Equipment control section 160 includes, for example, first to third children's content tables 625-1 to 625-3 illustrated in FIGS. 7A to 7C. Each of first to third children's content tables 625-1 to 625-3 describes information (for example, the program name of content) indicating children's content in association with order 626. First children's content table 625-1 describes children's content in an education genre. Second children's content table 625-2 describes children's content in a natural science genre. Third children's content table 625-3 describes animation content for children.

For example, it is assumed that control codes "yyy5" and "yyy6" are control codes which are simultaneously set at a certain button resetting timing, and are set to be associated with operations of sending contents in different genres.

Equipment control section 160, for example, periodically refers to the operation history. In addition, equipment control section 160 assigns children's content in a genre with a high operation frequency to an operation button different from children's content in other genres if at all possible. In other words, equipment control section 160 associates children's content table 625 with each of "yyy5" and "yyy6."

For example, it is assumed that a viewing frequency of children's content in an education genre is very high. In this case, equipment control section 160 assigns the control code "yyy5" to first children's content table 625-1, and assigns the control code "yyy6" to second and third children's content tables 625-2 and 625-3.

In addition, for example, it is assumed that viewing frequencies of children's content in a natural science genre and animation content for children are very high. In this case, equipment control section 160 assigns the control code "yyy5" to second children's content table 625-2, and assigns the control code "yyy6" to first and third children's content tables 625-1 and 625-3.

In addition, each time the control code "yyy5" or "yyy6" is input, equipment control section 160 sequentially changes display of children's content according to order 626 of corresponding children's content tables 625. In a case where control codes are assigned to a plurality of children's content tables 625, each time a corresponding control code is input, equipment control section 160 changes display of content according to order 626 of respective children's content tables 625.

Further, equipment control section 160 may specify children's content of which broadcast is in progress, and may successively generate a children's content table which lists only children's contents of which broadcast is in progress. Determination on children's content is performed using information given to a program guide or information regarding data broadcast. In addition, sequentially changed children's content has been content of which broadcast is in progress, but may be content of which broadcast is in progress or accumulated content.

When equipment control section 160 displays content, content specifying section 170 specifies the content and a genre of the content, and outputs the specified content and the genre to operation history holding section 180. For example, in a case where content is provided using a terrestrial digital broadcast, content specifying section 170 specifies the content and a genre thereof from data broadcast or program information included in received data of the terrestrial digital broadcast.

Operation history holding section 180 accumulates operation history in the above-described operation region during the limitation mode.

Specifically, each time a function code and information regarding turning on and off of power are input from operation analysis section 150, operation history holding section 180 assembles content and a genre input from content specifying section 170, and an input time thereof, and holds a result of the assembly.

Figure 8:
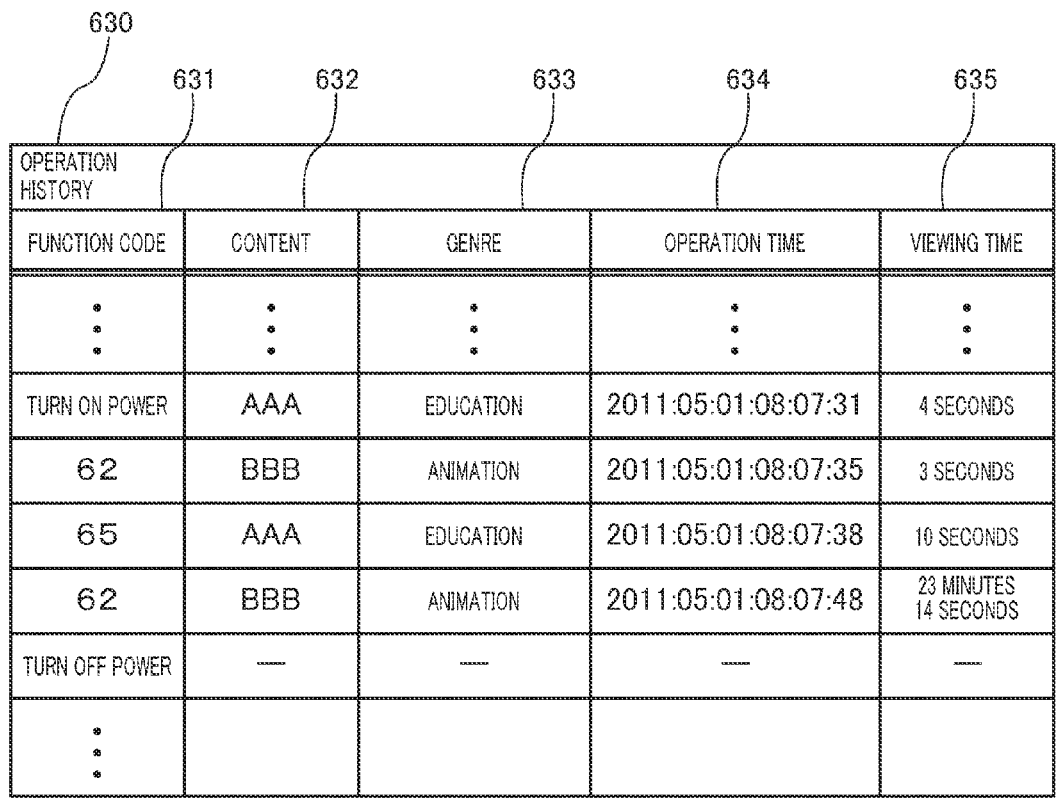
FIG. 8 is a diagram illustrating an example of details of operation history according to Embodiment 2 of the present invention.

FIG. 8 is a diagram illustrating an example of details of operation history.

As illustrated in FIG. 8, operation history 630 describes function code 631, content 632, genre 633, operation time 634, and viewing time 635 in association with each other.

Function code 631 is information (operation details) input from operation analysis section 150, and describes a function code and information regarding turning on and off of power. Content 632 and genre 633 are information regarding content which is input from content specifying section 170 immediately after information described in function code 631 is input. In other words, content 632 and genre 633 are information indicating content which is an operation target and a genre thereof. Operation time 634 is a time point when information described in function code 631 is input. Viewing time 635 is time until an operation of the next content is performed.

Limitation setting rule storage section 190 of FIG. 4 stores a limitation setting rule which describes control codes which are available in the limitation mode along with a resetting condition.

Figure 9:
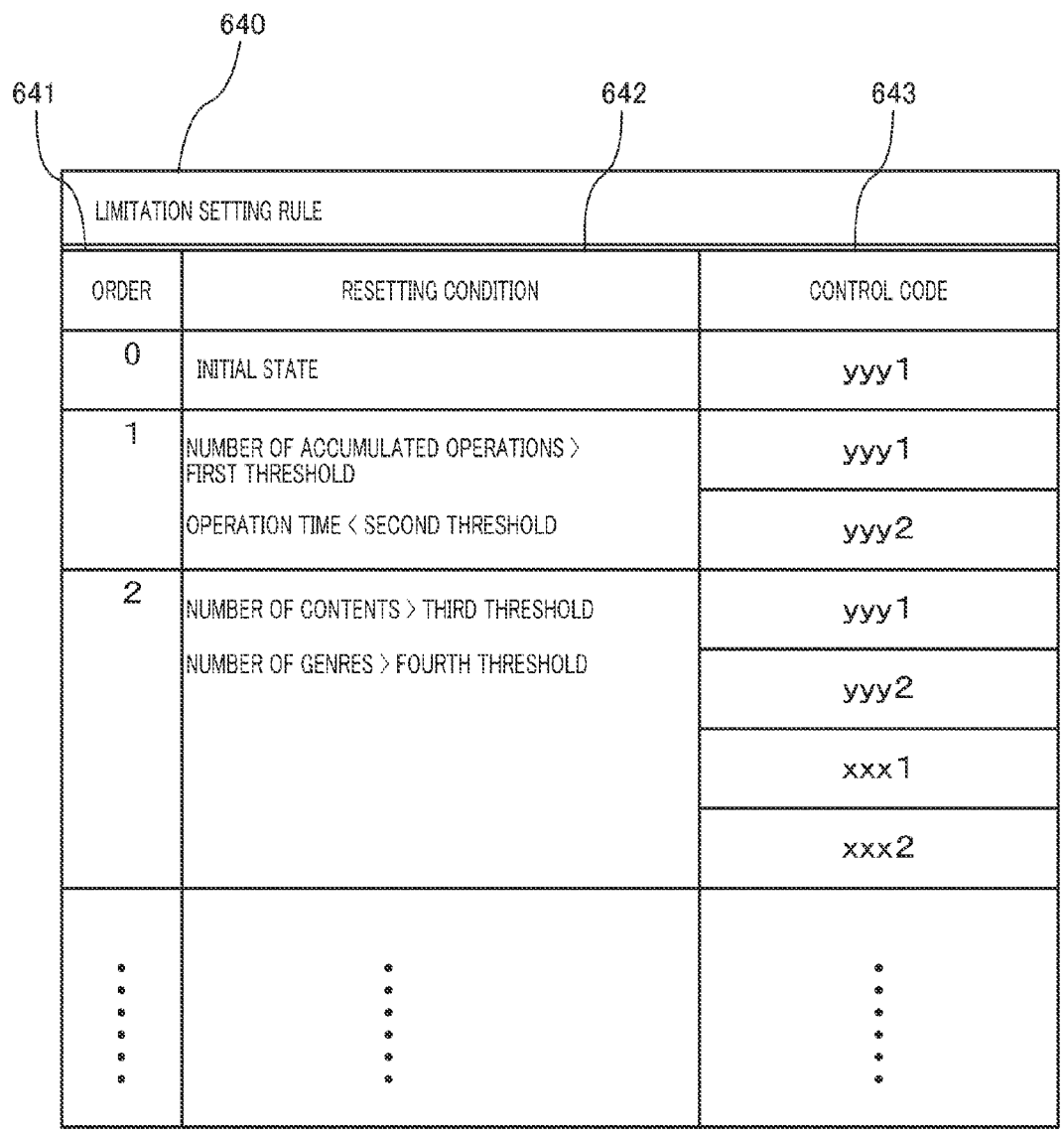
FIG. 9 is a diagram illustrating an example of details of a limitation setting rule according to Embodiment 2 of the present invention.

FIG. 9 is a diagram illustrating an example of details of the limitation setting rule.

As illustrated in FIG. 9, limitation setting rule 640 describes resetting condition 642 and one or a plurality of control codes 643 in association with order 641.

Order 641 indicates order used to determine a timing (hereinafter, referred to as a "resetting timing") of resetting an available control command. Resetting condition 642 is a condition regarding information which can be extracted from operation history 630 (refer to FIG. 8) stored in operation history holding section 180. Control code 643 is a control code of a control command to be allowed.

Resetting condition 642 is that, for example, the number of accumulated operations in operation region 510 (refer to FIG. 3) is larger than a first threshold, and an operation time required in operations from changing selection of a content to finalizing the selection of the content is smaller than a second threshold. In addition, the next resetting condition 642 is that the number of finalized selection of contents is larger than a third threshold, and the number of genres of finalized selection of contents is larger than a fourth threshold.

Typically, in relation to an operation performance of a child, as the number of accumulated operations becomes larger, a performance of the child pushing the operation buttons 520 is improved. In addition, in relation to an operation performance of a child, an operation time is shortened if the child performs an operation for a specific purpose. If the child is interested in more information, the child views more content. Therefore, resetting condition 642 is a condition corresponding to a development level of a child. In addition, corresponding control code 643 is a control code of a control command which is to be allowed for a child with the same development level.

For example, a control code "yyy2" is assumed as a control code which is recognized as a content return operation limited to, for example, children's content in equipment control section 160. In addition, a control code "xxx1" is one of normal commands, and is assumed as a control code which is recognized as a volume increase operation in equipment control section 160. A control code "xxx2" is one of normal commands, and is assumed as a control code which is recognized as a volume decrease operation in equipment control section 160.

Further, a limitation command may be used for a content sending or content return operation for each genre, or may be used for a channel sending or channel return operation. Furthermore, the limitation command may be used for a content operation, a channel operation, and a genre operation together. Moreover, target content may include content of which broadcast is in progress as well as accumulated content.

In this case, a child only can perform a content sending operation of children's content at first due to remote control resetting, but, finally, can perform a content return operation, and, further can also perform a volume operation.

Control command setting section 200 of FIG. 4 resets an available control command on the basis of operation history 630 (refer to FIG. 8).

Specifically, control command setting section 200 periodically extracts information for determining whether or not resetting condition 642 (refer to FIG. 9) of limitation setting rule 640 is satisfied, from operation history 630. In the above-described example, control command setting section 200 extracts, for example, the number of accumulated operations, an operation time, the number of contents, and the number of genres.

In addition, control command setting section 200 determines whether or not the extracted information satisfies a resetting condition in the current order. In other words, control command setting section 200 determines whether or not the resetting condition in the order of "1" is satisfied in the initial state. Further, in a case where it is determined that any resetting condition in the past is satisfied, control command setting section 200 selects a resetting condition in the next order of the resetting condition which is determined last as such. Furthermore, control command setting section 200 determines whether or not the selected resetting condition is satisfied.

In a case where the extracted information satisfies the resetting condition, control command setting section 200 determines that a resetting timing has come and thus extracts all corresponding control codes. In addition, control command setting section 200 outputs a bundle of extracted control codes to operation region setting section 210.

Operation region setting section 210 resets a division of operation region 510 (refer to FIG. 3) on the basis of operation history 630 (refer to FIG. 8) and the available control command.

Specifically, operation region setting section 210 stores in advance information regarding an arrangement of operation buttons 520 in operation region 510 of remote control 500. In addition, each time a bundle of control codes are input, operation region setting section 210 divides the operation region (refer to FIG. 8) into the same number as the number of the input control codes (in other words, the number of control commands; hereinafter, referred to as a "number of control commands").

At this time, operation region setting section 210 refers to operation history 630 (refer to FIG. 8) and specifies a region which is highly frequently used (hereinafter, referred to as a "frequently-used region") in operation region 510. The frequently-used region is, for example, a region where operation buttons of which an accumulated value of the number of times of pushing exceeds an average value are distributed. In addition, operation region setting section 210 divides the frequently-used region. Further, the division of operation region 510 refers to grouping the operation buttons on operation region 510.

In addition, operation region setting section 210 associates the divided regions with input control codes in an one-to-one relationship, and updates details of limitation table 620 (refer to FIG. 6) in the button correspondence. As a result, available control commands are changed depending on changes in operation details during the limitation mode. Further, grouping of operation buttons for each control command is performed in order to perform a plurality of operations in a region which is easily used by a child on the basis of operation details during the limitation mode.

In addition, operation region setting section 210 may set in advance a priority in a division direction, the number of operation buttons included in a single group, a dividing position, and the like, and may determine a dividing position from the priority and a use frequency. For example, operation region setting section 210 preferentially determines the boundaries of sub-regions 511 to 516 (refer to FIG. 3), or a boundary extending horizontally, as a dividing position.

Remote control command setting apparatus 100 has, for example, a CPU, and a storage medium such as a RAM. In this case, the above-described respective function sections are implemented by the CPU executing a control program.

Remote control command setting apparatus 100 with this configuration can limit a command which can be used in the limitation mode. In addition, remote control command setting apparatus 100 can accumulate operation history 630 (refer to FIG. 8) indicating which button is actually used to perform an operation on which content.

In addition, remote control command setting apparatus 100 can determine update timings of limitation table 620 and update details thereof on the basis of the limitation setting rule 640 (refer to FIG. 9) corresponding to a development level of a child. In relation to limitation of an operation, the number of allowable operations can be increased, that is, for example, only a content sending operation can be performed at first, but, if the number of operations exceeds 500, a content sending operation and a content return operation can be performed. Further, remote control command setting apparatus 100 can divide operation region 510 so that a child can perform a plurality of operations in a region which is actually easily operated by the child.

In addition, remote control command setting apparatus 100 sets association between a control code and a children's content table for each genre, and thus operation region 510 can be divided depending on genres. Further, remote control command setting apparatus 100 performs this setting on the basis of operation history and thus can provide an easier operation.

In other words, remote control command setting apparatus 100 can implement a remote control which is easily used by a child, while limiting some operation of the remote control.

The above description relates to a configuration of remote control command setting apparatus 100.

Next, an operation of remote control command setting apparatus 100 will be described.

Figure 10:
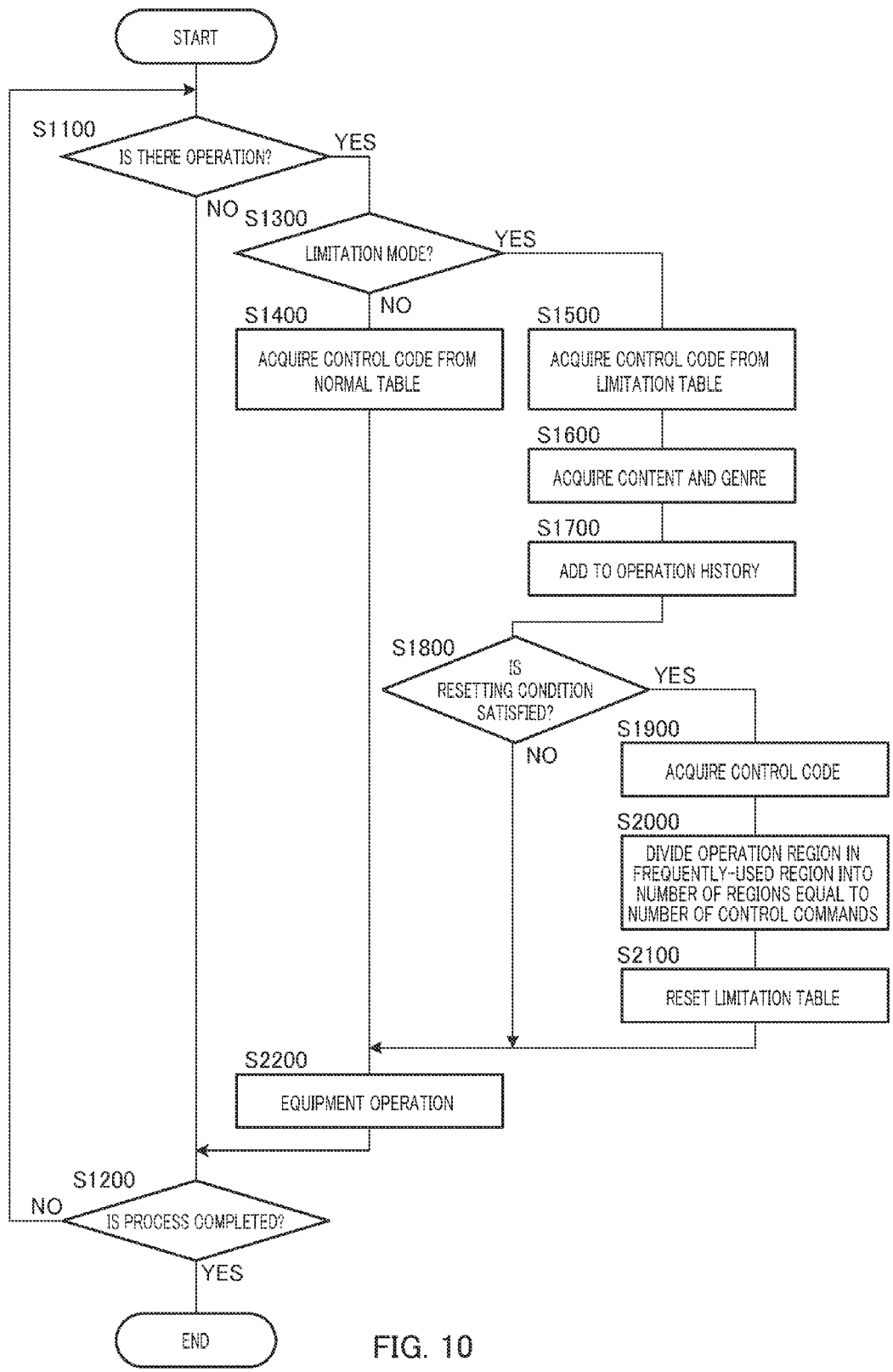
FIG. 10 is a flowchart illustrating an example of an operation of the remote control command setting apparatus according to Embodiment 2 of the present invention.

FIG. 10 a flowchart illustrating an example of an operation of remote control command setting apparatus 100. In addition, it is assumed that, during the operation illustrated in FIG. 10, remote control reception section 140 outputs a remote control signal to operation analysis section 150 each time the remote control signal is received. Further, it is assumed that, each time mode changing is instructed through a user's operation or the like, mode setting section 110 notifies operation analysis section 150 of the mode changing. Furthermore, it is assumed that equipment control section 160 successively sets association between a control code and a children's content table based on operation history.

First, in step S1100, operation analysis section 150 determines whether or not a new operation is performed in remote control 500. In other words, operation analysis section 150 determines whether or not a remote control signal is input. Operation analysis section 150 proceeds to step S1200 if there is no operation (S1100: NO). In addition, operation analysis section 150 proceeds to step S1300 if there is an operation (S1100: YES).

In step S1300, operation analysis section 150 determines whether or not a limitation mode occurs. If the limitation mode does not occur (S1300: NO), operation analysis section 150 proceeds to step S1400. In addition, if the limitation mode occurs (S1300: YES), operation analysis section 150 proceeds to step S1500.

In step S1400, operation analysis section 150 refers to normal table 610 (refer to FIG. 5) in order to acquire a control code corresponding to a function code indicated by the remote control signal, and proceeds to step S2200 described later.

On the other hand, in step S1500, operation analysis section 150 refers to limitation table 620 (refer to FIG. 6) in order to acquire a control code corresponding to a function code indicated by the remote control signal.

In addition, in step S1600, content specifying section 170 acquires content which is an operation target and a genre thereof.

In addition, in step S1700, operation history holding section 180 adds the operation details, the genre, and the operation time to operation history 630 (refer to FIG. 8) as a set.

Further, in step S1800, control command setting section 200 refers to operation history 630 in order to determine whether or not resetting condition 642 (refer to FIG. 9) of limitation setting rule 640 is satisfied. If resetting condition 642 is not satisfied (S1800: NO), control command setting section 200 proceeds to step S2200. In addition, if resetting condition 642 is satisfied, that is, a resetting timing has come (S1800: YES), control command setting section 200 proceeds to step S1900.

In step S1900, control command setting section 200 acquires a bundle of control codes 643 corresponding to the satisfied resetting condition from limitation setting rule 640.

In addition, in step S2000, operation region setting section 210 divides operation region 510 (refer to FIG. 3) so that the number of divided regions matches the number of control commands and in order to be divided in a frequently-used region. Further, the number of divided regions indicates the number of groups of grouped operation buttons.

In addition, operation region setting section 210 may monitor operation history 630 regardless of the presence or absence of inputting of a control command from control command setting section 200, and may reset a division of the operation region in a case where a frequently-used region changes.

Further, operation region setting section 210 may hold a division of operation region 510 and may update only association with a control code in a case where a control command is input from control command setting section 200 but the number of control commands does not change.

In addition, in step S2100, operation region setting section 210 associates each region of divided operation regions 510 with a corresponding control code in order to reset limitation table 620 (refer to FIG. 6), and proceeds to step S1200.

Figure 11:
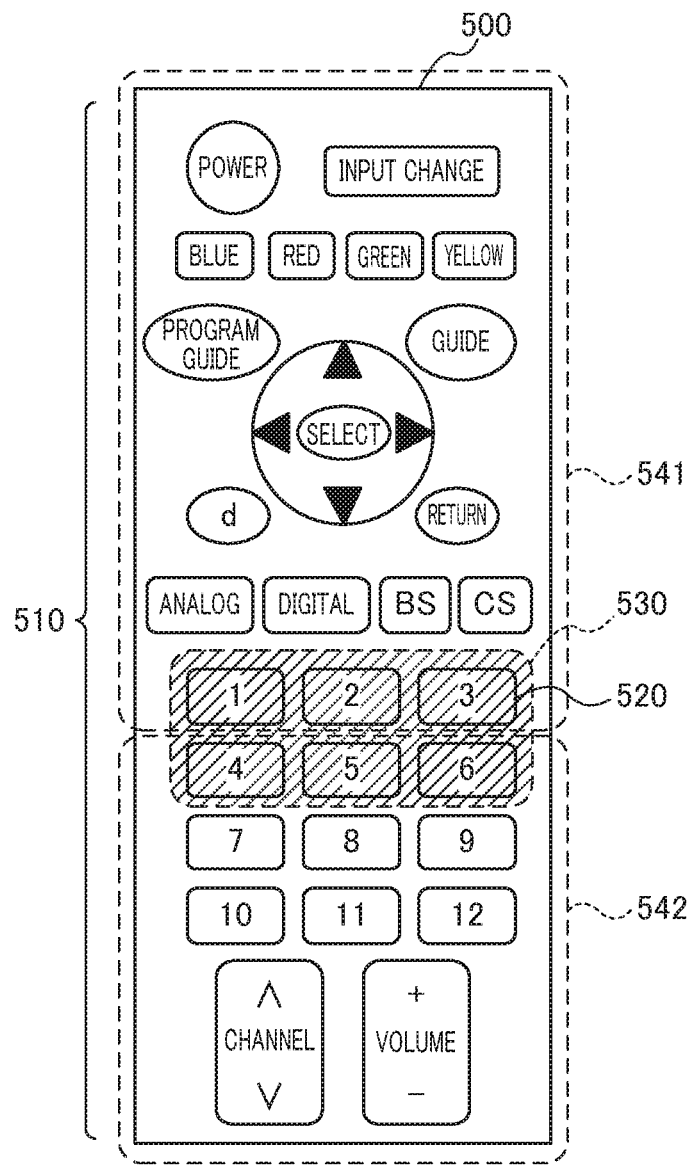
FIG. 11 is a diagram illustrating an example of a relationship between a frequently-used region and a division position of an operation region according to Embodiment 2 of the present invention.

FIG. 11 is a diagram illustrating an example of a relationship between a frequently-used region and the position of divisions of the operation region.

As illustrated in FIG. 11, it is assumed that frequently-used region 530 is a central part of operation region 510 and can be divided inside thereof. In this case, operation region setting section 210 divides operation region 510 inside frequently-used region 530. In addition, operation region setting section 210 assigns different operations to upper region 541 including frequently-used region 530 and lower region 542 including frequently-used region 530.

Operation buttons 520 of frequently-used region 530 are operation buttons which are easily pushed by a child. Therefore, in the present embodiment, when the number of control commands increases, frequently-used region 530 is divided in this way, and thus easiness of an operation is maintained.

In addition, in step S2200 of FIG. 10, equipment control section 160 performs an equipment operation corresponding to a control code and proceeds to step S1200.

In step S1200, operation analysis section 150 determines whether or not there is an instruction for finishing the processes such as turning off power of television set 400 (refer to FIG. 2). Operation analysis section 150 returns to step S1100 if there is no finish instruction (S1200: NO). In addition, operation analysis section 150 finishes a series of processes if there is a finish instruction (S1200: YES).

Further, remote control command setting apparatus 100 preferably performs the respective determination processes in steps S1100, S1200 and S1800 at a predetermined cycle.

Due to this operation, remote control command setting apparatus 100 performs button resetting of remote control 500 according to actual operation history of a child.

The above description relates to an operation of remote control command setting apparatus 100.

As above, remote control command setting apparatus 100 according to the present embodiment accumulates operation history in operation region 510, and resets an available control command and a division of operation region 510 on the basis of the operation history. Accordingly, remote control command setting apparatus 100 can perform button resetting according to the actual operation history of a child, and thus can implement a remote control which is easily used by a child, while limiting some operation of the remote control.

In addition, since remote control command setting apparatus 100 does not disable any operation button, if any operation button is pushed, a response of electrical equipment is obtained without fail, and thus a child is highly satisfied. Further, a child can easily perform an operation with his/her hand without relying on an adult. On the other hand, remote control command setting apparatus 100 can prevent misoperations of a child such as recording of undesirable content, canceling of recording reservation, and failure or deletion of recorded content, for example, in television set 400 having a content recording function. In other words, remote control command setting apparatus 100 can provide operation circumstances which satisfy both a child and an adult.

Embodiment 3

Embodiment 3 of the present invention is an example in which a child is notified of a resetting timing of a button correspondence.

Figure 12:
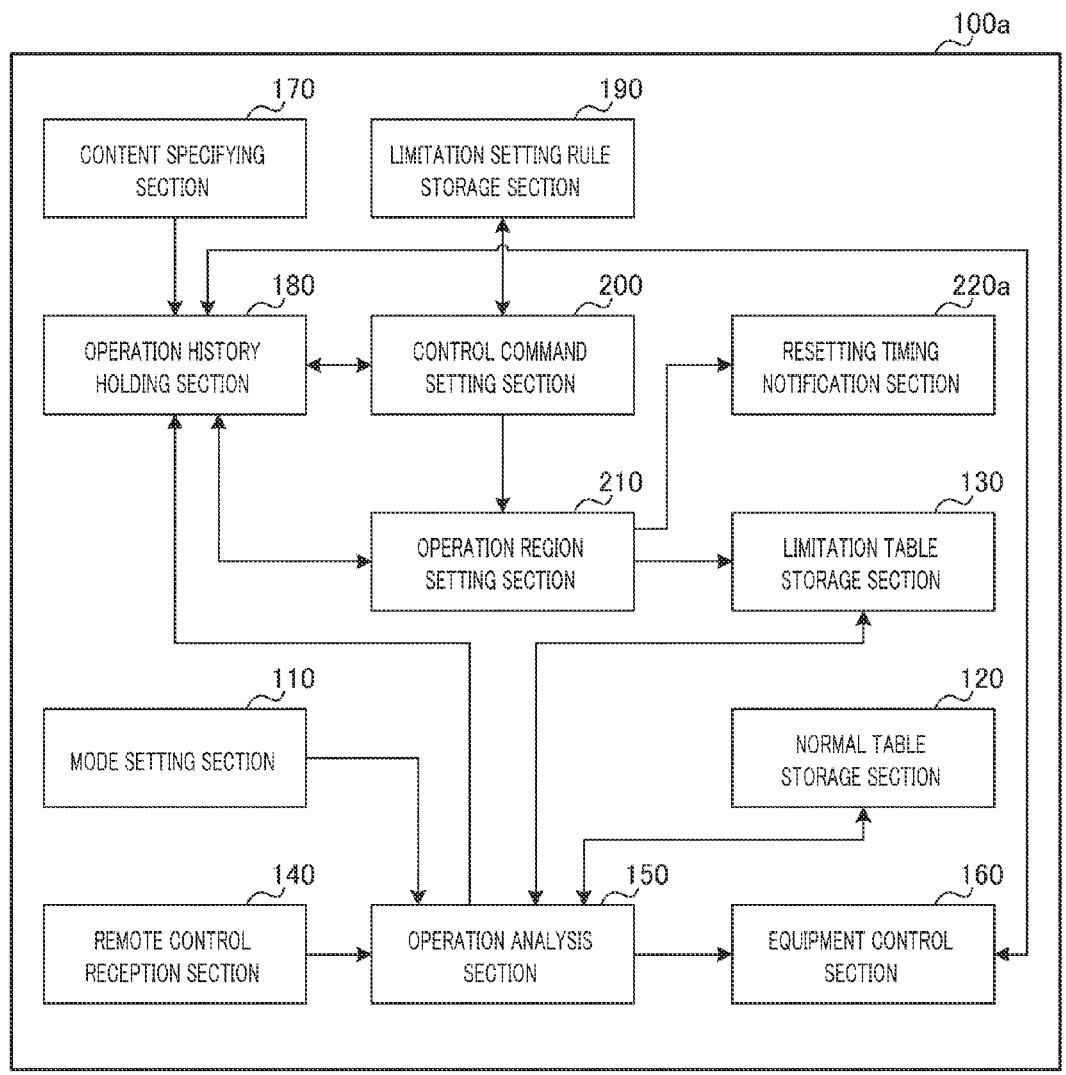
FIG. 12 is a block diagram illustrating an example of a configuration of a remote control command setting apparatus according to Embodiment 3 of the present invention.

FIG. 12 is a block diagram illustrating an example of a configuration of a remote control command setting apparatus according to the present embodiment, and corresponds to FIG. 4 of Embodiment 2. The same part as in FIG. 4 is given the same reference numeral, and description thereof will be omitted.

In FIG. 12, remote control command setting apparatus 100a has resetting timing notification section 220a in addition to the configuration illustrated in FIG. 4.

In addition, in the present embodiment, it is assumed that, each time an available control command changes, control command setting section 200 notifies (feeds back) resetting timing notification section 220a of the change. Further, it is assumed that, each time resetting of the limitation table is performed, operation region setting section 210 notifies resetting timing notification section 220a of the resetting.

Each time at least one of available control command and a division of operation region 510 (refer to FIG. 3) is reset, resetting timing notification section 220a indicates the resetting, for example, using sound. In addition, resetting timing notification section 220a may perform a notification each time a button is operated, for example, for a prescribed number of times or a prescribed time after resetting is performed.

Specifically, resetting timing notification section 220a outputs a predefined sound each time a notification indicating that an available control command changes is received, and each time a notification indicating that the limitation table is reset is received. The predefined sound is, for example, animal cries or musical sounds. Outputting of the sounds is performed, for example, using a speaker of television set 400 (refer to FIG. 2).

In addition, resetting timing notification section 220a may output different kinds of sounds according to details of a control command to be reset, the number of notifications, or the like. Further, resetting timing notification section 220a may display an image or the like indicating the number of divisions of the operation region or a division of the operation region by using a screen of television set 400 (refer to FIG. 2), along with the sound output.

Each time button resetting is performed, remote control command setting apparatus 100a notifies a child of the button resetting, and thus it is possible to prevent the child from being perplexed due to changing in a button correspondence without being noticed. In other words, remote control command setting apparatus 100a encourages a child to instantly learn the new button correspondence, and thus can implement a remote control which is easily used by the child.

Embodiment 4

Embodiment 4 of the present invention is an example in which a child is notified of details of resetting a correspondence of a button.

Figure 13:
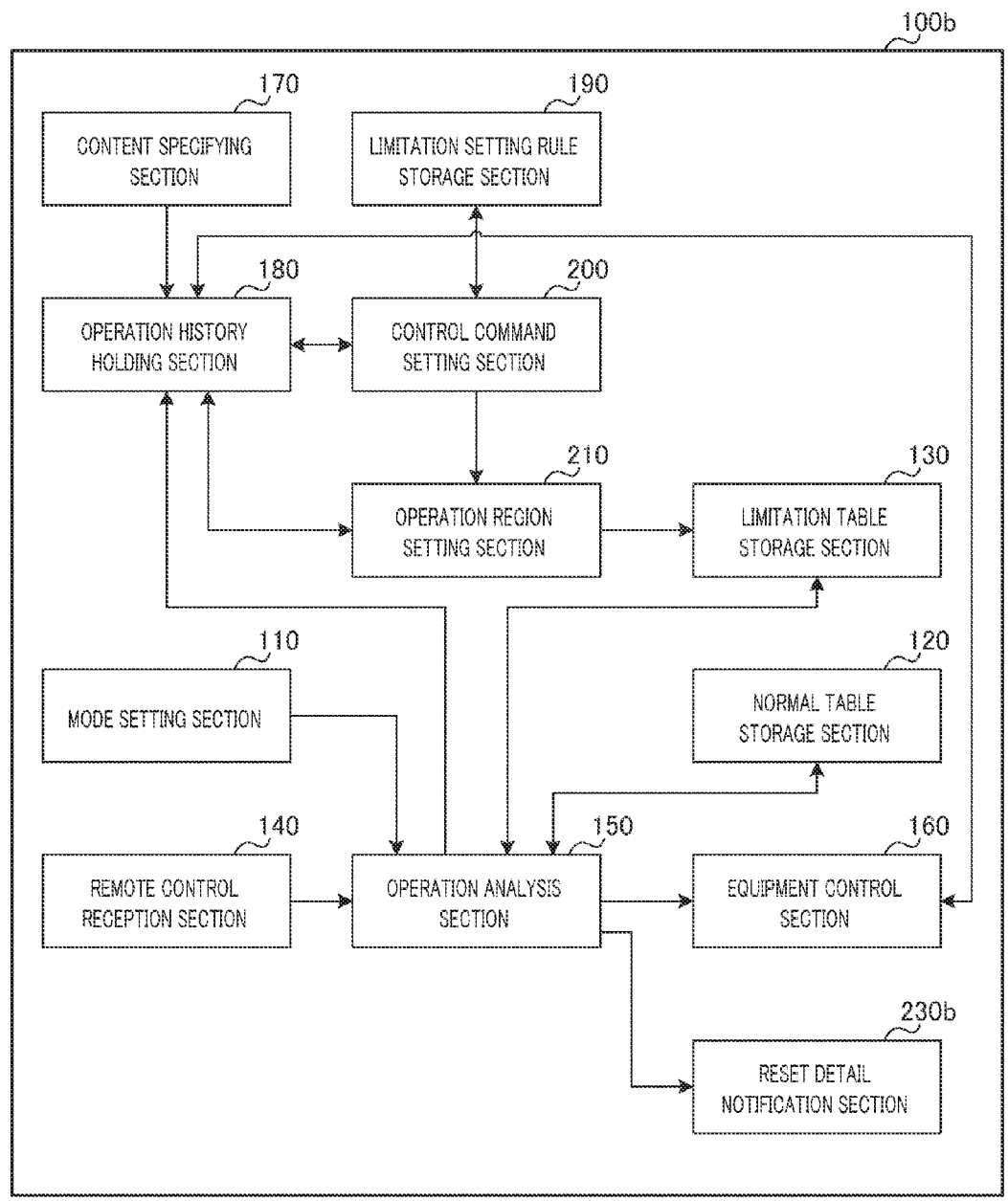
FIG. 13 is a block diagram illustrating an example of a configuration of a remote control command setting apparatus according to Embodiment 4 of the present invention.

FIG. 13 is a block diagram illustrating an example of a configuration of a remote control command setting apparatus according to the present embodiment and corresponds to FIG. 4 of Embodiment 2. The same part as in FIG. 4 is given the same reference numeral, and description thereof will be omitted.

In FIG. 13, remote control command setting apparatus 100b has reset detail notification section 230b in addition to the configuration illustrated in FIG. 4.

In addition, in the present embodiment, it is assumed that operation analysis section 150 also outputs a control code corresponding to a remote control signal to reset detail notification section 230b in the limitation mode.

Reset detail notification section 230b indicates a division of the operation region by using at least one of a difference between sounds output when the operation buttons are operated and a difference between exteriors of the operation buttons.

Specifically, in the present embodiment, reset detail notification section 230b outputs a sound predefined for each control code, such as animal cries, musical sounds, or the like, each time the control code is input. Outputting of the sounds is performed, for example, using a speaker of television set 400 (refer to FIG. 2).

In addition, reset detail notification section 230b may output a sound or a synthetic sound indicative of details of a control command corresponding to the control code or a genre of content which is an operation target.

This remote control command setting apparatus 100b enables a group of operation buttons 520 or corresponding operation details to be understood by using sounds in addition to an inherent response of television set 400 such as sending of content. In other words, remote control command setting apparatus 100b encourages a child to instantly learn a role of each operation button 520, and thus can implement a remote control which is easily used by a child.

In addition, in a case where remote control 500 can change an exterior for each operation button 520, reset detail notification section 230b may transmit a control signal for controlling the exterior of each operation button 520 to remote control 500 on the basis of details of the limitation table. In this case, for example, reset detail notification section 230b transmits exterior designation information predefined for each control code to remote control 500 in association with a function code each time the limitation table is reset.

The operation button 520 of which an exterior can be changed is a key switch having a function of emitting light while changing a plurality of colors, or a button image of a so-called smart remote control which has a liquid crystal touch panel as an operation region.

Embodiment 5

Embodiment 5 of the present invention is an example in which channels are not changed but contents are sequentially changed when an operation is performed in the limitation mode of a remote control operation. A remote control command setting apparatus according to the present embodiment has a function of creating content tables according to the number of divisions of the operation region of the remote control.

<Configuration of Remote Control Command Setting Apparatus 100c>

Figure 14:
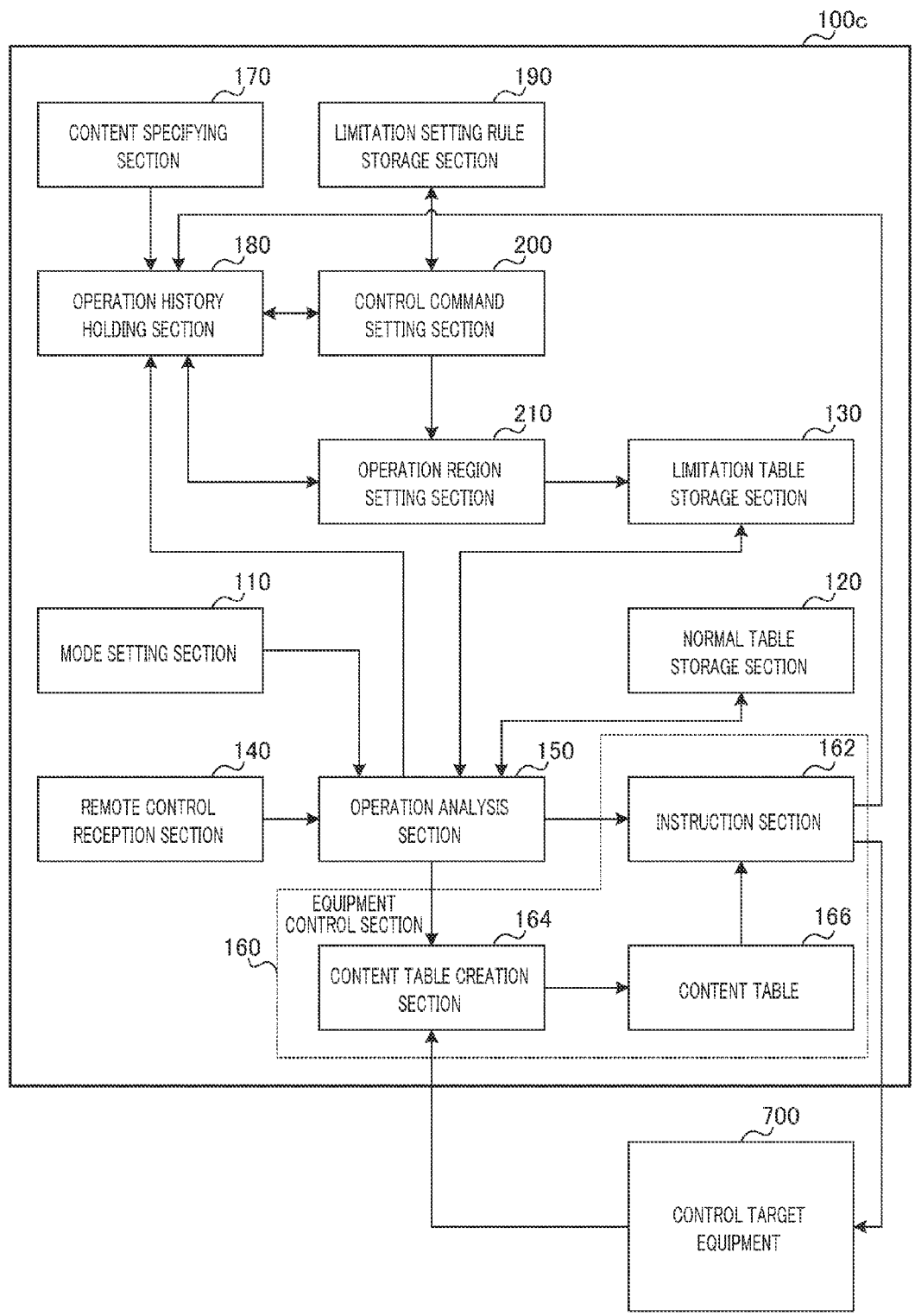
FIG. 14 is a block diagram illustrating an example of a configuration of a remote control command setting apparatus according to Embodiment 5 of the present invention.

FIG. 14 is a block diagram illustrating an example of a configuration of remote control command setting apparatus 100c according to the present embodiment, and corresponds to FIG. 4 of Embodiment 2. The same part as in FIG. 4 is given the same reference numeral, and description thereof will be omitted.

In FIG. 14, equipment control section 160 is formed by instruction section 162, content table creation section 164, and content table 166.

Content table creation section 164 creates content table 166 corresponding to each control code (operation region) according to the number of control codes corresponding to the operation region (hereinafter, referred to as an "number of operation region divisions").

Specifically, first, content table creation section 164 acquires content list 650 which is a list of contents stored in control target equipment 700. Control target equipment 700 is, for example, television set 400 illustrated in FIG. 2. Content list 650 will be described later.

In addition, content table creation section 164 acquires the number of operation regions from operation analysis section 150. Further, content table creation section 164 creates content table 166 based on the acquired number of operation region divisions and based on classification information included in acquired content list 650. Content table 166 will be described later.

Instruction section 162 performs an instruction corresponding to an input control command on control target equipment 700.

When a predetermined operation region is operated, content table 166 prescribes a reproduction order of contents which are linked to a control code corresponding to the operation and are changed for each operation. In other words, content table 166 describes contents which are sequentially reproduced for each operation region when each operation region is operated. For example, content table 166 sequentially describes n contents in order from a content of which the recording date and time is the latest.

The configuration of remote control command setting apparatus 100c has been described thus far.

<Configuration of Content List 650>

Next, an example of content list 650 will be described. FIG. 15 illustrates an example of content list 650 stored in control target equipment 700.

In FIG. 15, content list 650 includes No (identification number) 651, content ID 652, title 653, genre 654, recording date 655, start time 656, and duration 657. Content ID 652 is identification information which is given for specifying a content. Classification information for classifying contents includes title 653, genre 654, recording date 655, start time 656, and duration 657.

Content list 650 is updated by a content recording instruction or a content deletion instruction from a user.

Content table creation section 164 acquires content list 650 from control target equipment 700. In addition, content table creation section 164 creates content table 166 on the basis of the classification information included in content list 650. Content table creation section 164 may arrange contents in order from a content of which the recording date and time is the latest on the basis of, for example, recording date 655 and start time 656, and may describe content ID 652 and title 653 in the arranged order. Further, content table creation section 164 may divide and describe contents in different tables on the basis of, for example, genre 654. Furthermore, content table creation section 164 may arrange contents according to duration 657, and may divide and describe the contents into contents with the short duration and contents with the long duration in different tables.

<Description of Content Table 166>

Next, each example of content table 166 will be described. Hereinafter, descriptions will be respectively made of content table 660 when the number of operation region divisions is 1 and content tables 661 and 662 when the number of operation region divisions is 2, as an example of content table 166.

FIG. 16 illustrates an example of content table 660 created when the number of operation region divisions is 1. Content table creation section 164 creates single content table 660 when the number of operation region divisions input from operation analysis section 150 is 1.

In FIG. 16, content table 660 includes No (identification number) 661, content ID 662, and title 663. Content table 660 describes, for example, twelve content IDs 662 and twelve titles 663 in order in which the recording date of a content is the latest from the top. As described above, the order in which the recording date and time of a content is the latest is specified by content table creation section 164 on the basis of recording date 655 and start time 656 which are classification information. In addition, the number of contents which can be described in content table 660 is not limited to twelve illustrated in FIG. 16.

FIGS. 17A and 17B respectively illustrate an example of content tables 661 and 662 created when the number of operation region divisions is 2. Content table creation section 164 creates content table 661 and content table 662 when the number of operation region divisions input from operation analysis section 150 is 2.

In FIGS. 17A and 17B, each of content tables 661 and 662 includes No (identification number) 661, content ID 662, and title 663. Here, in content tables 661 and 662, as an example, contents in the same genre are described in the same table, and the number of contents described in content tables 661 and 662 is the same as each other. Content table 661 sequentially describes six contents in music and animation genres from a content of which the recording date and time is the latest. On the other hand, content table 662 sequentially describes six contents in animal and education genres from a content of which the recording date and time is the latest.

In addition, content table creation section 164 may respectively create content tables 661 and 662 so that genres do not overlap each other, or some of genres overlap each other.

Also in a case where the number of operation region divisions is 3 or more, content table creation section 164 divides the contents described in content list 650 on the basis of, for example, genre 654 which is classification information, in order to generate content tables. In addition, in the above description, contents are divided based on genre 654 of content list 650, but the present invention is not limited thereto.

In addition, in the present embodiment, the contents described in content tables 660, 661 and 662 are assumed to be sequentially reproduced in order from the top (in order in which No 661 is smaller), respectively.

<Operation of Remote Control Command Setting Apparatus 100c>

Next, an operation of remote control command setting apparatus 100c will be described.

Figure 18:
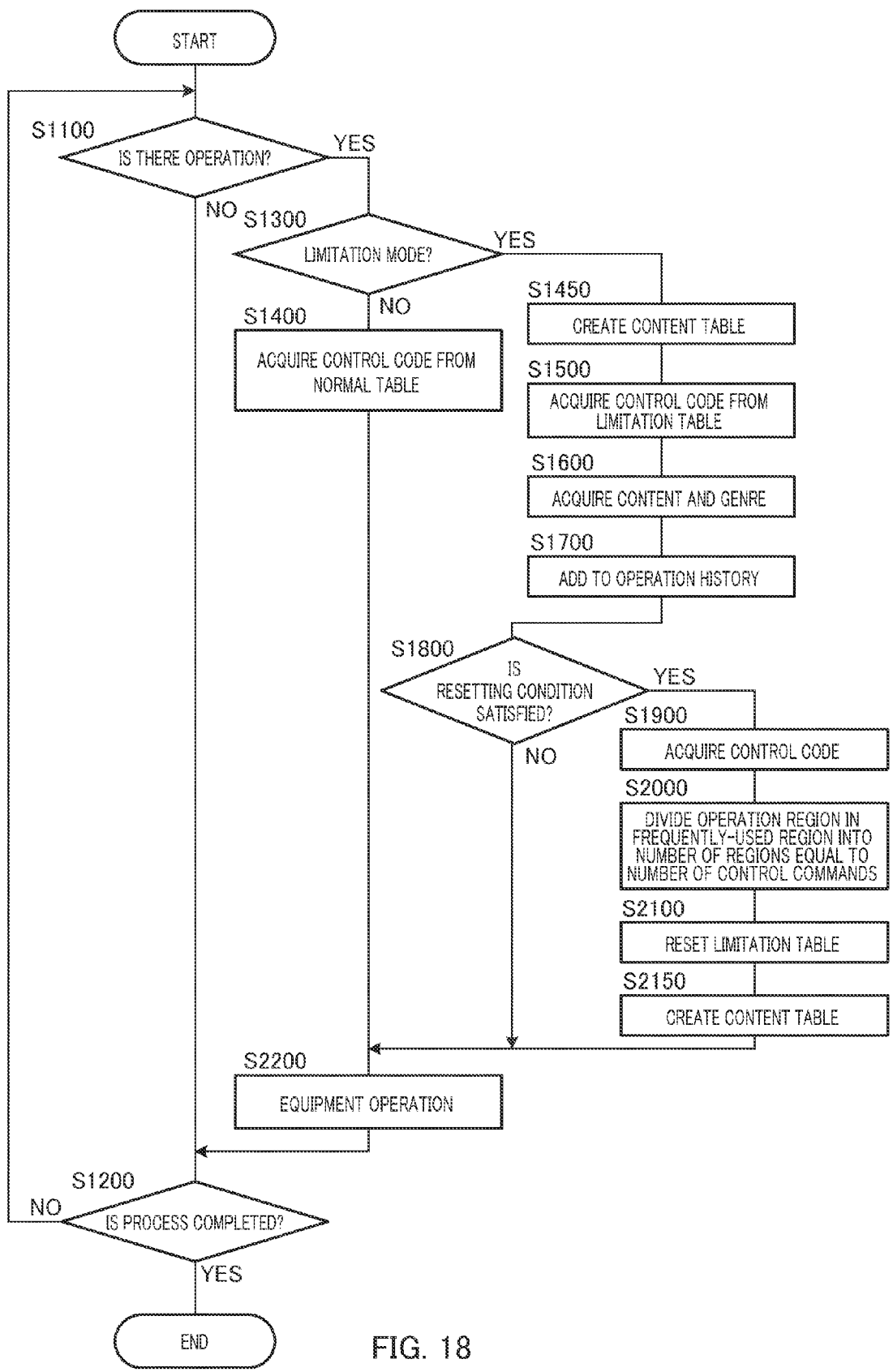
FIG. 18 is a flowchart illustrating an example of an operation of the remote control command setting apparatus according to Embodiment 5 of the present invention.

FIG. 18 is a flowchart illustrating an example of an operation of remote control command setting apparatus 100c. The flowchart illustrated in FIG. 18 includes S1450 and S2150 as content table creation steps in addition to the flowchart of FIG. 10. In addition, hereinafter, a step having the same function as in FIG. 10 is given the same reference numeral, and description thereof will be omitted.

First, in step S1100, operation analysis section 150 determines whether or not a new operation is performed in remote control 500. In other words, operation analysis section 150 determines whether or not a remote control signal is input. Operation analysis section 150 proceeds to step S1200 if there is no operation (S1100: NO). In addition, operation analysis section 150 proceeds to step S1300 if there is an operation (S1100: YES).

In step S1300, operation analysis section 150 determines whether or not a limitation mode occurs. If the limitation mode does not occur (S1300: NO), operation analysis section 150 proceeds to step S1400. In addition, if the limitation mode occurs (S1300: YES), operation analysis section 150 proceeds to step S1450.

In step S1450, content table creation section 164 refers to content list 650 and the current number of operation region divisions (an initial value is 1) in order to create a content table on the basis of classification information, and proceeds to step S1500. Here, as an example, content table creation section 164 selects twelve contents in order in which the recording date and time of a content is the latest on the basis of recording date 655 and start time 656 of content list 650 in order to create content table 660 illustrated in FIG. 16.

Steps S1500 to S2100 have been described with reference to FIG. 10 in Embodiment 2, and thus description thereof will be omitted.

In step S2100, operation region setting section 210 associates each region of divided operation regions 510 with a corresponding control code in order to reset limitation table 620 (refer to FIG. 6). Operation region setting section 210 proceeds to step S2150 in a case where the number of region divisions increases, and an increased control code is assigned to an increase in a content table.

In step S2150, content table creation section 164 refers to content list 650 and the current number of operation region divisions in order to create a content table on the basis of classification information. Here, an example in which the number of operation region divisions is 2 will be described. In other words, in a case where the number of operation region divisions is 2, content table creation section 164 creates two content tables on the basis of content list 650. Content table creation section 164 counts the number of contents, for example, for each genre 654 of content list 650, and assigns the contents of content list 650 to two content tables so that the number of contents is equalized. As a result, the number of contents assigned to each content table is, for example, six as illustrated in FIGS. 17A and 17B. In addition, content table creation section 164 arranges the contents assigned to each content table in order in which the recording date and time is the latest on the basis of recording date 655 and start time 656 of content list 650. Further, content table creation section 164 generates content table 661 and content table 662.

In step S2200, equipment control section 160 performs an equipment operation instruction corresponding to a control code and proceeds to step S1200.

In step S1200, operation analysis section 150 determines whether or not there is an instruction for finishing the processes such as turning off power of control target equipment 700. Operation analysis section 150 returns to step S1100 if there is no finish instruction (S1200: NO). In addition, operation analysis section 150 finishes a series of processes if there is a finish instruction (S1200: YES).

As above, in remote control command setting apparatus 100c, if a button of which a region is divided is pushed, channels are not changed but "contents are sequentially changed", and thus it is possible to implement a remote control which enables a content to be easily selected and is easily used by a child. In addition, in the remote control command setting apparatus, each time a button is reset, a content table linked to a region is created and updated.

In addition, although, in the present embodiment, in creating a content table, contents are registered in order in which the recording date and time thereof is the latest, the present invention is not limited thereto. When content table 166 is created, contents may be registered in order in which a viewing frequency thereof is higher using operation history, or contents may be registered in order in which the most recent reproduction date and time is the latest.

In addition, although content table creation section 164 starts for each operation when the limitation mode is set, the content table creation section may be configured to start only when content list 650 is updated and when the number of operation region divisions increases.

In addition, although, in the above-described respective embodiments, a case where the operation button of the remote control is a key switch has been described, the present invention is not limited thereto. The present invention is applicable to the above-described start remote control. In this case, the operation region setting section may reset regions into which a screen is divided as button image regions corresponding to control commands, and may transmit a control signal for changing details displayed on the screen to the smart remote control.

In addition, although, in the above-described respective embodiments, a case where an available control command is defined by a control code has been described, an application of the present invention is not limited thereto. An available control command may be defined by an operation target (that is, content, a genre of content, or the like).

In this case, the limitation table may describe information (for example, a list of children's programs) indicating an available operation target. In addition, the operation analysis section may perform limitation of an operation target using content in addition to button resetting based on a control code.

In addition, the operation analysis section may further perform operation control such as more limitation of an operation or forced termination of content display on the basis of other information such as continuous viewing time.

In addition, the equipment control section may set association between a control code and a children's content table not based on an operation frequency but based on other information such as similarity of genres. For example, the equipment control section may set association so that, as similarity of two genres is lower (as a distance between the genres is longer), two divided regions which are more separated from each other or two divided regions which are closer to each other are assigned to the genres.

In addition, the remote control command setting apparatus is disposed on the electrical equipment side in the above-described respective embodiments, but is not limited thereto. The remote control command setting apparatus may be disposed on, for example, the remote control side. In this case, the remote control command setting apparatus is required to have an operation region, an operation analysis section, and a remote control command transmission section which transmits a signal indicating a control command to electrical equipment each time the control command is output from the operation analysis section. Further, the remote control command setting apparatus may be disposed in an external apparatus of electrical equipment such as a set top box (STB) of the electrical equipment.

In addition, timings and details of resetting are not limited to the above-described example. For example, the remote control command setting apparatus may determine timings of resetting and control codes to be set on the basis of other information such as an age (age in months) of a child, or may perform forced resetting on the basis of an operation by a user such as a parent.

In addition, the target of the operation limitation in the above-described respective embodiments is a child but is not limited thereto. For example, in a case of an elderly person, it may be difficult to finely operate an operation button. This difficulty in fine operation is different for each elderly person, and further varies with an age. Therefore, the present invention is applied to a remote control for old people, and thus it is possible to implement a remote control which is easily used by old people. Further, in this case, a resetting condition and order thereof are preferably set according to details corresponding to a level of operation difficulty of an elderly person.

As described above, a remote control command setting apparatus according to the embodiments of the present invention is an apparatus configured to reset a correspondence between an operation in an operation region where a plurality of operation buttons are disposed and a control command for electrical equipment, the remote control command setting apparatus including: an operation history holding section that accumulates an operation history in the operation region; a control command setting section that resets, based on the operation history, the control command which is available, by being triggered by an acquired limitation mode; an operation region setting section that obtains a number of divisions of the operation region based on the operation history and the available control command and updates a correspondence between an operation of the operation button in a division of the operation region and a control command for the electrical equipment, the division having been reset; an operation analysis section that extracts a control command based on the correspondence, for an acquired new operation of the operation button; and an equipment control section that sequentially issues, each time newly receiving the control command, an instruction to reproduce a content corresponding to the control command from a content table which is created in advance in association with the division and in which a reproducible content is described.

The disclosure of Japanese Patent Application No. 2011-145617, filed on Jun. 30, 2011, including the specification, drawings, and abstract, is incorporated herein by reference in its entirety.

INDUSTRIAL APPLICABILITY

The remote control command setting apparatus and the remote control command setting method according to the present invention are useful as a remote control command setting apparatus and a remote control command setting apparatus capable of realizing a remote control which is easily used by a child, while limiting some operation of the remote control.

REFERENCE SIGNS LIST 100, 100a, 100b, and 100c Remote control command setting apparatus
110 Mode setting section
120 Normal table storage section
130 Limitation table storage section
140 Remote control reception section
150 Operation analysis section
160 Equipment control section
162 Instruction section
164 Content table creation section
166 Content table
170 Content specifying section
180 Operation history holding section
190 Limitation setting rule storage section
200 Control command setting section
210 Operation region setting section
220a Resetting timing notification section
230b Reset detail notification section
300 AV system
400 Television set
500 Remote control
510 Operation region
520 Operation button
700 Control target equipment

The invention claimed is:

1. A remote control command setting apparatus configured to reset a correspondence between an operation in an operation region where a plurality of operation buttons are disposed and a control command for electrical equipment, the remote control command setting apparatus comprising:

an operation history holding section that accumulates an operation history in the operation region;

a control command setting section that resets, based on the operation history, the control command which is available, by being triggered by an acquired limitation mode;

an operation region setting section that obtains a number of divisions of the operation region based on the operation history and the available control command and updates a correspondence between an operation of the operation button in a division of the operation region and a control command for the electrical equipment, the division having been reset;

an operation analysis section that extracts a control command based on the correspondence, for an acquired new operation of the operation button; and an equipment control section that sequentially issues, each time newly receiving the control command, an instruction to reproduce a content corresponding to the control command from a content table which is created in advance in association with the division and in which a reproducible content is described.

2. The remote control command setting apparatus according to claim 1, further comprising a content table creation section that creates a content table corresponding to the number of divisions based on an acquired recording list including classification information and based on the number of divisions from the operation analysis section, the content table being a table in which a reproducible content is described.

3. The remote control command setting apparatus according to claim 2, wherein the content table creation section updates the content table by being triggered by a change in the number of divisions from the operation analysis section or triggered when the limitation mode is set.

4. The remote control command setting apparatus according to claim 1, wherein the operation region setting section divides the operation region in a frequently used region of the operation region.

5. The remote control command setting apparatus according to claim 1, wherein:

the electrical equipment is equipment that outputs a plurality of contents;

the control command setting section extracts at least one of the number of accumulated operations in the operation region, an operation time required in an operation from changing selection of a content to finalizing the selection of the content, the number of finalized selection of the contents, and the number of genres of the finalized selection of contents, and determines whether or not a timing for resetting the control command which is available has come based on the extracted information; and the operation region setting section, at least, resets the division of the operation region each time the control command setting section resets the available control command.

6. The remote control command setting apparatus according to claim 1, further comprising a resetting timing notification section that indicates resetting of at least one of the available control command and the division of the operation region by using a sound each time at least one of the available control command and the division of the operation region is reset.

7. The remote control command setting apparatus according to claim 1, further comprising a resetting detail notification section that indicates the division of the operation region by using at least one of a difference between sounds output when operations are performed in the operation region and a difference between exteriors of the operation buttons.

8. The remote control command setting apparatus according to claim 1, wherein the operation region setting section divides the operation region according to the number of the control commands which are available, and assigns the divided regions of the operation region to the available control commands in a one-to-one relationship.

9. The remote control command setting apparatus according to claim 8, further comprising a mode setting section that switches between a normal mode and a limitation mode and sets one of the modes, the limitation mode being a mode for a user whose use of a control command is to be limited, wherein:

the operation history is operation history for the operation region in the limitation mode; and the available control command is a limitation command as the control command which is available in the limitation mode, and which is different from the control command available in the normal mode.

10. The remote control command setting apparatus according to claim 8, further comprising a remote control reception section that receives a signal indicating an operation in the operation region from a remote controller having the operation region, wherein the operation analysis section outputs the control command corresponding to an operation indicated by the signal to an equipment control section of the electrical equipment each time the remote control reception section receives the signal.

11. The remote control command setting apparatus according to claim 1, further comprising a content specifying section that specifies a content which is selected as an output target among the plurality of contents, wherein the operation history includes information indicating a content which is an operation target in the operation region.

12. A remote control command setting method of resetting a correspondence between an operation in an operation region where a plurality of operation buttons are disposed and a control command for electrical equipment, the remote control command setting method comprising:

determining whether or not a timing for resetting the control command which is available has come based on operation history in the operation region;

resetting the available control command when the timing has come;

resetting a division of the operation region based on the operation history and the available control command when the available control command is reset;

obtaining a number of divisions of the operation region based on the operation history and the available control command and updating a correspondence between an operation of the operation button in a division of the operation region and a control command for the electrical equipment, the division having been reset;

extracting a control command based on the correspondence for an acquired new operation of the operation button; and sequentially issuing, each time newly receiving the control command, an instruction to reproduce a content corresponding to the control command from a content table which is created in advance in association with the division and in which a reproducible content is described.

* * * * *